(12) United States Patent
Edwards et al.

(10) Patent No.: US 10,978,797 B2
(45) Date of Patent: Apr. 13, 2021

(54) ELECTRONIC DEVICES HAVING ANTENNA ARRAY APERTURES MOUNTED AGAINST A DIELECTRIC LAYER

(71) Applicant: Apple Inc., Cupertino, CA (US)

(72) Inventors: Jennifer M. Edwards, San Francisco, CA (US); Harish Rajagopalan, San Jose, CA (US); Simone Paulotto, Redwood City, CA (US); Bilgehan Avser, Mountain View, CA (US); Hao Xu, Cupertino, CA (US); Rodney A. Gomez Angulo, Santa Clara, CA (US); Siwen Yong, San Francisco, CA (US); Matthew A. Mow, Los Altos, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 15/950,072

(22) Filed: Apr. 10, 2018

(65) Prior Publication Data

US 2019/0312347 A1 Oct. 10, 2019

(51) Int. Cl.
*H01Q 1/24* (2006.01)
*H01Q 1/52* (2006.01)
(Continued)

(52) U.S. Cl.
CPC .............. *H01Q 1/523* (2013.01); *H01Q 1/243* (2013.01); *H01Q 1/48* (2013.01); *H01Q 9/0407* (2013.01); *H01Q 21/26* (2013.01); *H04M 1/0266* (2013.01)

(58) Field of Classification Search
CPC .......... H01Q 1/523; H01Q 1/243; H01Q 1/48; H01Q 1/52; H01Q 21/26; H01Q 9/0407;
(Continued)

(56) References Cited

U.S. PATENT DOCUMENTS 6,421,012 B1 7/2002 Heckaman
6,445,346 B2 9/2002 Fathy et al.
(Continued)

FOREIGN PATENT DOCUMENTS

JP 2017085289 A 5/2017
KR 101014347 B1 2/2011

OTHER PUBLICATIONS

Matthew Mow et al., U.S. Appl. No. 15/217,805, filed Jul. 22, 2016.
(Continued)

*Primary Examiner* — Awat M Salih
(74) *Attorney, Agent, or Firm* — Treyz Law Group, P.C.; Michael H. Lyons; Tianyi He

(57) ABSTRACT

An electronic device may be provided with a dielectric cover layer and a conductive layer on the dielectric cover layer. The conductive layer may define an opening. A dielectric spacer may be mounted to the cover layer within the opening. A substrate may be mounted to the spacer. Vertical conductive structures may extend from the conductive layer to the substrate and may laterally surround the spacer. A phased antenna array may be formed on the substrate and aligned with the opening. The cover layer may have a dielectric constant and thickness that are selected to form a quarter wave impedance transformer for the array at a wavelength of operation of the array. The spacer and the conductive structures may exhibit a cavity resonance at the wavelength. The array and the conductive structures may radiate radio-frequency signals at millimeter wave frequencies through the dielectric cover layer.

20 Claims, 12 Drawing Sheets

(51) Int. Cl.
*H01Q 21/26* (2006.01)
*H01Q 9/04* (2006.01)
*H04M 1/02* (2006.01)
*H01Q 1/48* (2006.01)

(58) Field of Classification Search
CPC .......... H01Q 9/0435; H01Q 5/42; H01Q 3/26; H04M 1/0266; H04M 1/026
See application file for complete search history.

(56) References Cited

U.S. PATENT DOCUMENTS

| | | | |
|---|---|---|---|
| 7,050,004 | B2 | 5/2006 | Shafai et al. |
| 7,595,759 | B2 | 9/2009 | Schlub et al. |
| 8,102,330 | B1 | 1/2012 | Albers |
| 9,178,268 | B2 | 11/2015 | Zhu et al. |
| 9,929,472 | B2 * | 3/2018 | Rojanski .................. H01Q 1/38 |
| 2005/0110685 | A1 | 5/2005 | Frederik du Toit |
| 2006/0267844 | A1 | 11/2006 | Yanagi et al. |
| 2008/0218418 | A1 * | 9/2008 | Gillette .................. H01Q 13/18 343/700 MS |
| 2008/0316121 | A1 | 12/2008 | Hobson et al. |
| 2014/0203995 | A1 | 7/2014 | Romney et al. |
| 2014/0210486 | A1 | 7/2014 | Dijkstra |
| 2015/0194730 | A1 | 7/2015 | Sudo et al. |
| 2015/0333407 | A1 | 11/2015 | Yamagajo et al. |
| 2017/0256867 | A1 | 9/2017 | Ding et al. |
| 2018/0090851 | A1 * | 3/2018 | Feldman ............ H01Q 21/0075 |
| 2018/0159203 | A1 | 6/2018 | Baks et al. |
| 2018/0191081 | A1 * | 7/2018 | Lukyanov ............. H01Q 1/243 |
| 2018/0198204 | A1 | 7/2018 | Kovacic |

OTHER PUBLICATIONS

Basim H. Noori et al., U.S. Appl. No. 15/138,689, filed Apr. 26, 2016.

* cited by examiner

US 10,978,797 B2

ELECTRONIC DEVICES HAVING ANTENNA ARRAY APERTURES MOUNTED AGAINST A DIELECTRIC LAYER

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums and can generation undesirable surface waves at medium interfaces.

It would therefore be desirable to be able to provide electronic devices with improved wireless communications circuitry such as communications circuitry that supports millimeter and centimeter wave communications.

SUMMARY

An electronic device may be provided with wireless circuitry. The wireless circuitry may include one or more antennas and transceiver circuitry such as centimeter and millimeter wave transceiver circuitry (e.g., circuitry that transmits and receives antennas signals at frequencies greater than 10 GHz). The antennas may be arranged in a phased antenna array.

The electronic device may include a housing having a dielectric cover layer. The phased antenna array may be formed on a dielectric substrate and may include conductive traces. The conductive traces may form antenna resonating elements and/or parasitic elements for antennas in the phased antenna array. A conductive layer may be formed on an interior surface of the dielectric cover layer. The conductive layer may define an opening. A dielectric spacer may be mounted to the interior surface of the dielectric cover layer within the opening in the conductive layer. The dielectric substrate may be mounted to the dielectric spacer. Vertical conductive structures may be formed on the dielectric spacer and may extend downwards from the conductive layer to the dielectric substrate. The vertical conductive structures may laterally surround the opening and the dielectric spacer. Fences of conductive vias may extend through the dielectric substrate and may laterally surround the phased antenna array in the substrate. The vertical conductive structures may be aligned with and shorted to the fences of conductive vias. The fences of conductive vias may be coupled to ground traces within the substrate.

The dielectric cover layer may have a dielectric constant and a thickness that are selected so that the dielectric cover layer forms a quarter wave impedance transformer for the phased antenna array at a wavelength of operation of the phased antenna array. The dielectric spacer may have a dielectric constant that is less than the dielectric constant of the dielectric cover layer and a thickness that is greater than the thickness of the dielectric cover layer. The phased antenna array may be aligned with the dielectric spacer and the opening in the conductive layer.

The dielectric spacer may have lateral dimensions that are selected so that the dielectric spacer and the conductive structures exhibit one or more cavity resonances at the wavelength of operation of the phased antenna array. The phased antenna array may excite the cavity resonances of the conductive structures and the dielectric spacer. In this way, the phased antenna array and the conductive structures may radiate radio-frequency signals through the dielectric cover layer with enhanced antenna gain across the field of view of the phased antenna array (e.g., compensating for attenuation, signal reflection, and destructive interference due to the presence of the dielectric cover layer over the phased antenna array). The conductive structures and the conductive layer may block surface waves from propagating along the interior surface of the dielectric cover layer.

DETAILED DESCRIPTION

Figure 1:
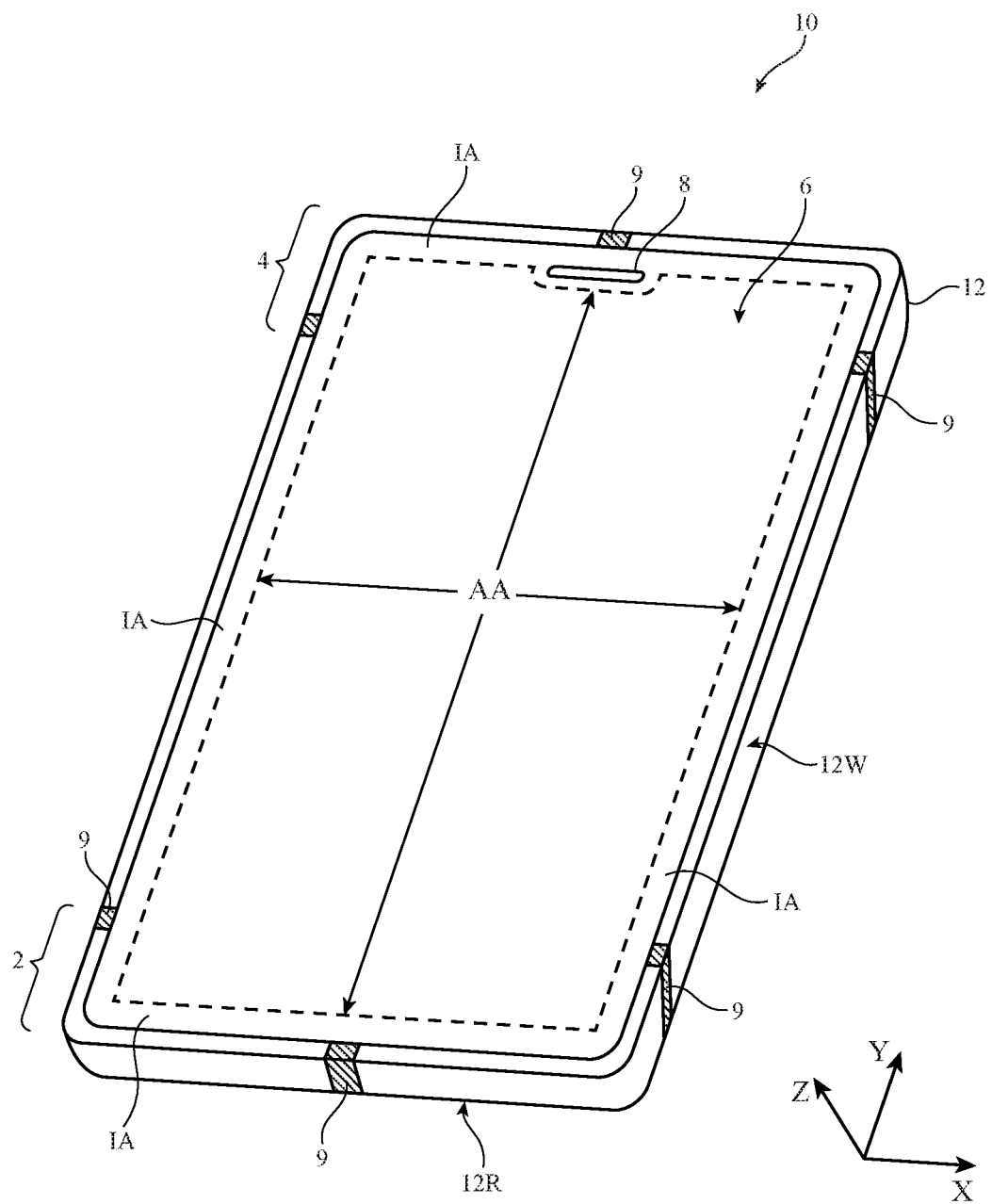
FIG. 1 is a perspective view of an illustrative electronic device in accordance with an embodiment.

Electronic devices such as electronic device 10 of FIG. 1 may contain wireless circuitry. The wireless circuitry may include one or more antennas. The antennas may include phased antenna arrays that are used for handling millimeter wave and centimeter wave communications. Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz. While uses of millimeter wave communications may be described herein as examples, centimeter wave communications, EHF communications, or any other types of communications may be similarly used. If desired, electronic devices may also contain wireless communications circuitry for handling satellite navigation system signals, cellular telephone signals, local wireless area network signals, near-field communications, light-based wireless communications, or other wireless communications.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 6. Display 6 may be mounted on the front face of device 10. Display 6 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and conductive portions of rear housing wall 12R may sometimes be referred to herein collectively as conductive structures of housing 12. Peripheral structures 12W may run around the periphery of device 10 and display 6. In configurations in which device 10 and display 6 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 6 (e.g., a cosmetic trim that surrounds all four sides of display 6 and/or that helps hold display 6 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 6 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 6), peripheral conductive housing structures 12W may run around the lip of housing 12 (i.e., peripheral conductive housing structures 12W may cover only the edge of housing 12 that surrounds display 6 and not the rest of the sidewalls of housing 12).

Rear housing wall 12R may lie in a plane that is parallel to display 6. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide peripheral conductive structures 12W and/or conductive portions of rear housing wall 12R from view of the user).

Display 6 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 6 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 6 that overlaps inactive area IA may be coated with an opaque masking layer in inactive area IA. The opaque masking layer may have any suitable color.

Display 6 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 8 or a microphone port. Openings may be formed in housing 12 to form communications ports (e.g., an audio jack port, a digital data port, etc.) and/or audio ports for audio components such as a speaker and/or a microphone if desired.

Display 6 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive structures 12W). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 6, for example.

In regions 2 and 4, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 6, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 2 and 4 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 2 and 4. If desired, the ground plane that is under active area AA of display 6 and/or other metal structures in device 10 may have portions that extend into parts of the ends of device 10 (e.g., the ground may extend towards the dielectric-filled openings in regions 2 and 4), thereby narrowing the slots in regions 2 and 4.

In general, device 10 may include any suitable number of antennas (e.g., one or more, two or more, three or more, four or more, etc.). The antennas in device 10 may be located at opposing first and second ends of an elongated device housing (e.g., ends at regions 2 and 4 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 9, as shown in FIG. 1. The gaps in peripheral conductive housing structures 12W may be filled with dielectric such as polymer, ceramic, glass, air, other dielectric materials, or combinations of these materials. Gaps 9 may divide peripheral conductive housing structures 12W into one or more peripheral conductive segments. There may be, for example, two peripheral conductive segments in peripheral conductive housing structures 12W (e.g., in an arrangement with two of gaps 9), three peripheral conductive segments (e.g., in an arrangement with three of gaps 9), four peripheral conductive segments (e.g., in an arrangement with four of gaps 9), six peripheral conductive segments (e.g., in an arrangement with six gaps 9), etc. The segments of peripheral conductive housing structures 12W that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 12W and may form antenna slots, gaps 9, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 4. A lower antenna may, for example, be formed at the lower end of device 10 in region 2. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, etc. Two or more antennas in device 10 may be arranged in a phased antenna array for covering millimeter and centimeter wave communications if desired.

In order to provide an end user of device 10 with as large of a display as possible (e.g., to maximize an area of the device used for displaying media, running applications, etc.), it may be desirable to increase the amount of area at the front face of device 10 that is covered by active area AA of display 6. Increasing the size of active area AA may reduce the size of inactive area IA within device 10. This may reduce the area behind display 6 that is available for antennas within device 10. For example, active area AA of display 6 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

Figure 2:
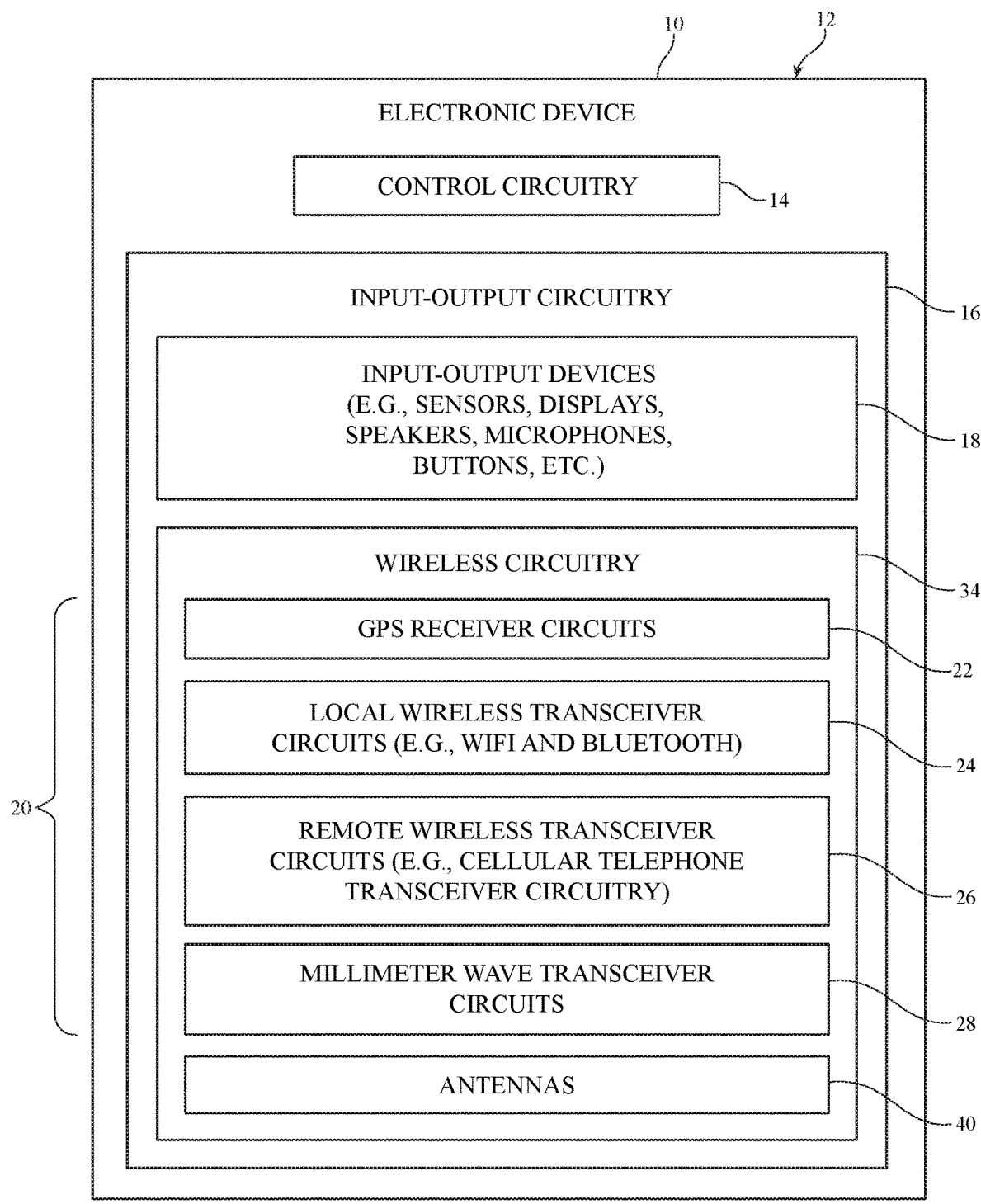
FIG. 2 is a schematic diagram of an illustrative electronic device with wireless communications circuitry in accordance with an embodiment.

FIG. 2 is a schematic diagram showing illustrative components that may be used in an electronic device such as electronic device 10. As shown in FIG. 2, device 10 may include storage and processing circuitry such as control circuitry 14. Control circuitry 14 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, baseband processor integrated circuits, application specific integrated circuits, etc.

Control circuitry 14 may be used to run software on device 10, such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other wireless personal area network protocols, IEEE 802.11ad protocols, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 20 for handling various radio-frequency communications bands. For example, circuitry 34 may include transceiver circuitry 22, 24, 26, and 28.

Transceiver circuitry 24 may be wireless local area network transceiver circuitry. Transceiver circuitry 24 may handle 2.4 GHz and 5 GHz bands for Wi-Fi® (IEEE 802.11) communications or other wireless local area network (WLAN) bands and may handle the 2.4 GHz Bluetooth® communications band or other wireless personal area network (WPAN) bands.

Circuitry 34 may use cellular telephone transceiver circuitry 26 for handling wireless communications in frequency ranges such as a low communications band from 600 to 960 MHz, a midband from 1710 to 2170 MHz, a high band from 2300 to 2700 MHz, an ultra-high band from 3400 to 3700 MHz, or other communications bands between 600 MHz and 4000 MHz or other suitable frequencies (as examples). Circuitry 26 may handle voice data and non-voice data.

Millimeter wave transceiver circuitry 28 (sometimes referred to as extremely high frequency (EHF) transceiver circuitry 28 or transceiver circuitry 28) may support communications at frequencies between about 10 GHz and 300 GHz. For example, transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 28 may support IEEE 802.11ad communications at 60 GHz and/or 5th generation mobile networks or 5th generation wireless systems (5G) communications bands between 27 GHz and 90 GHz. If desired, circuitry 28 may support communications at multiple frequency bands between 10 GHz and 300 GHz such as a first band from 27.5 GHz to 28.5 GHz, a second band from 37 GHz to 41 GHz, and a third band from 57 GHz to 71 GHz, or other communications bands between 10 GHz and 300 GHz. Circuitry 28 may be formed from one or more integrated circuits (e.g., multiple integrated circuits mounted on a common printed circuit in a system-in-package device, one or more integrated circuits mounted on different substrates, etc.). While circuitry 28 is sometimes referred to herein as millimeter wave transceiver circuitry 28, millimeter wave transceiver circuitry 28 may handle communications at any desired communications bands at frequencies between 10 GHz and 300 GHz (e.g., transceiver circuitry 28 may transmit and receive radio-frequency signals in millimeter wave communications bands, centimeter wave communications bands, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals that travel (over short distances) between a transmitter and a receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, stacked patch antenna structures, antenna structures having parasitic elements, inverted-F antenna structures, slot antenna structures, planar inverted-F antenna structures, monopoles, dipoles, helical antenna structures, Yagi (Yagi-Uda) antenna structures, surface integrated waveguide structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can be arranged in phased antenna arrays for handling millimeter wave and centimeter wave communications.

Transmission line paths may be used to route antenna signals within device 10. For example, transmission line paths may be used to couple antennas 40 to transceiver circuitry 20. Transmission line paths in device 10 may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides or grounded coplanar waveguides), transmission lines formed from combinations of transmission lines of these types, etc.

Transmission line paths in device 10 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 14 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40 if desired.

In some configurations, antennas 40 may include antenna arrays (e.g., phased antenna arrays to implement beam steering functions). For example, the antennas that are used in handling millimeter wave signals for extremely high frequency wireless transceiver circuits 28 may be implemented as phased antenna arrays. The radiating elements in a phased antenna array for supporting millimeter wave communications may be patch antennas, dipole antennas, Yagi (Yagi-Uda) antennas, or other suitable antenna elements. Transceiver circuitry 28 can be integrated with the phased antenna arrays to form integrated phased antenna array and transceiver circuit modules or packages (sometimes referred to herein as integrated antenna modules or antenna modules) if desired.

In devices such as handheld devices, the presence of an external object such as the hand of a user or a table or other surface on which a device is resting has a potential to block wireless signals such as millimeter wave signals. In addition, millimeter wave communications typically require a line of sight between antennas 40 and the antennas on an external device. Accordingly, it may be desirable to incorporate multiple phased antenna arrays into device 10, each of which is placed in a different location within or on device 10. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas from one or more different locations in device 10 are operated together may also be used (e.g., to form a phased antenna array, etc.).

Figure 3:
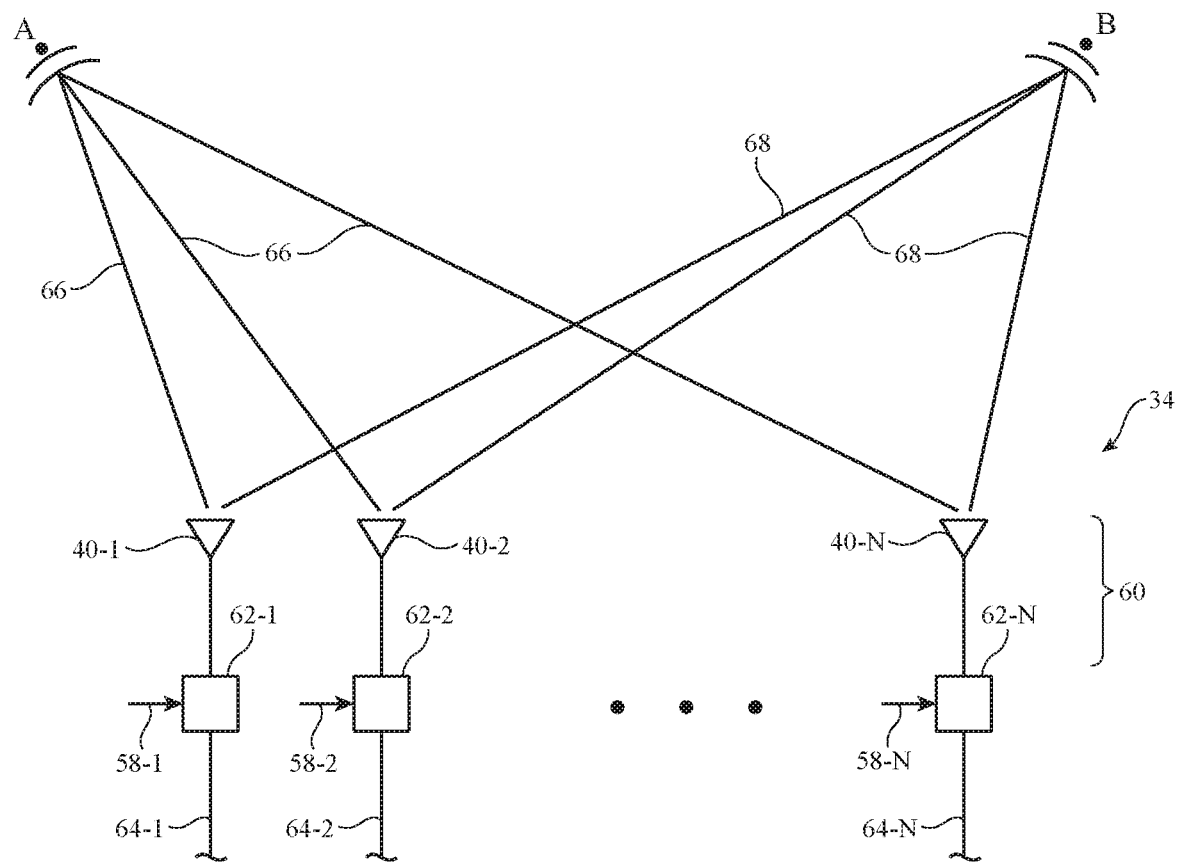
FIG. 3 is a diagram of an illustrative phased antenna array that may be adjusted using control circuitry to direct a beam of signals in accordance with an embodiment.

FIG. 3 shows how antennas 40 on device 10 may be formed in a phased antenna array. As shown in FIG. 3, phased antenna array 60 (sometimes referred to herein as array 60, antenna array 60, or array 60 of antennas 40) may be coupled to signal paths such as transmission line paths 64 (e.g., one or more radio-frequency transmission lines). For example, a first antenna 40-1 in phased antenna array 60 may be coupled to a first transmission line path 64-1, a second antenna 40-2 in phased antenna array 60 may be coupled to a second transmission line path 64-2, an Nth antenna 40-N in phased antenna array 60 may be coupled to an Nth transmission line path 64-N, etc. While antennas 40 are described herein as forming a phased antenna array, the antennas 40 in phased antenna array 60 may sometimes be referred to as collectively forming a single phased array antenna.

Antennas 40 in phased antenna array 60 may be arranged in any desired number of rows and columns or in any other desired pattern (e.g., the antennas need not be arranged in a grid pattern having rows and columns). During signal transmission operations, transmission line paths 64 may be used to supply signals (e.g., radio-frequency signals such as millimeter wave and/or centimeter wave signals) from transceiver circuitry 28 (FIG. 2) to phased antenna array 60 for wireless transmission to external wireless equipment. During signal reception operations, transmission line paths 64 may be used to convey signals received at phased antenna array 60 from external equipment to transceiver circuitry 28 (FIG. 2).

The use of multiple antennas 40 in phased antenna array 60 allows beam steering arrangements to be implemented by controlling the relative phases and magnitudes (amplitudes) of the radio-frequency signals conveyed by the antennas. In the example of FIG. 3, antennas 40 each have a corresponding radio-frequency phase and magnitude controller 62 (e.g., a first phase and magnitude controller 62-1 interposed on transmission line path 64-1 may control phase and magnitude for radio-frequency signals handled by antenna 40-1, a second phase and magnitude controller 62-2 interposed on transmission line path 64-2 may control phase and magnitude for radio-frequency signals handled by antenna 40-2, an Nth phase and magnitude controller 62-N interposed on transmission line path 64-N may control phase and magnitude for radio-frequency signals handled by antenna 40-N, etc.).

Phase and magnitude controllers 62 may each include circuitry for adjusting the phase of the radio-frequency signals on transmission line paths 64 (e.g., phase shifter circuits) and/or circuitry for adjusting the magnitude of the radio-frequency signals on transmission line paths 64 (e.g., power amplifier and/or low noise amplifier circuits). Phase and magnitude controllers 62 may sometimes be referred to collectively herein as beam steering circuitry (e.g., beam steering circuitry that steers the beam of radio-frequency signals transmitted and/or received by phased antenna array 60).

Phase and magnitude controllers 62 may adjust the relative phases and/or magnitudes of the transmitted signals that are provided to each of the antennas in phased antenna array 60 and may adjust the relative phases and/or magnitudes of the received signals that are received by phased antenna array 60 from external equipment. Phase and magnitude controllers 62 may, if desired, include phase detection circuitry for detecting the phases of the received signals that are received by phased antenna array 60 from external equipment. The term "beam" or "signal beam" may be used herein to collectively refer to wireless signals that are transmitted and received by phased antenna array 60 in a particular direction. The term "transmit beam" may sometimes be used herein to refer to wireless radio-frequency signals that are transmitted in a particular direction whereas the term "receive beam" may sometimes be used herein to refer to wireless radio-frequency signals that are received from a particular direction.

If, for example, phase and magnitude controllers 62 are adjusted to produce a first set of phases and/or magnitudes for transmitted millimeter wave signals, the transmitted signals will form a millimeter wave frequency transmit beam as shown by beam 66 of FIG. 3 that is oriented in the direction of point A. If, however, phase and magnitude controllers 62 are adjusted to produce a second set of phases and/or magnitudes for the transmitted millimeter wave signals, the transmitted signals will form a millimeter wave frequency transmit beam as shown by beam 68 that is oriented in the direction of point B. Similarly, if phase and magnitude controllers 62 are adjusted to produce the first set of phases and/or magnitudes, wireless signals (e.g., millimeter wave signals in a millimeter wave frequency receive beam) may be received from the direction of point A as shown by beam 66. If phase and magnitude controllers 62 are adjusted to produce the second set of phases and/or magnitudes, signals may be received from the direction of point B, as shown by beam 68.

Each phase and magnitude controller 62 may be controlled to produce a desired phase and/or magnitude based on a corresponding control signal 58 received from control circuitry 14 of FIG. 2 or other control circuitry in device 10 (e.g., the phase and/or magnitude provided by phase and magnitude controller 62-1 may be controlled using control signal 58-1, the phase and/or magnitude provided by phase and magnitude controller 62-2 may be controlled using control signal 58-2, etc.). If desired, control circuitry 14 may actively adjust control signals 58 in real time to steer the transmit or receive beam in different desired directions over time. Phase and magnitude controllers 62 may provide information identifying the phase of received signals to control circuitry 14 if desired.

When performing millimeter or centimeter wave communications, radio-frequency signals are conveyed over a line of sight path between phased antenna array 60 and external equipment. If the external equipment is located at location A of FIG. 3, phase and magnitude controllers 62 may be adjusted to steer the signal beam towards direction A. If the external equipment is located at location B, phase and magnitude controllers 62 may be adjusted to steer the signal beam towards direction B. In the example of FIG. 3, beam steering is shown as being performed over a single degree of freedom for the sake of simplicity (e.g., towards the left and right on the page of FIG. 3). However, in practice, the beam is steered over two or more degrees of freedom (e.g., in three dimensions, into and out of the page and to the left and right on the page of FIG. 3).

Figure 4:
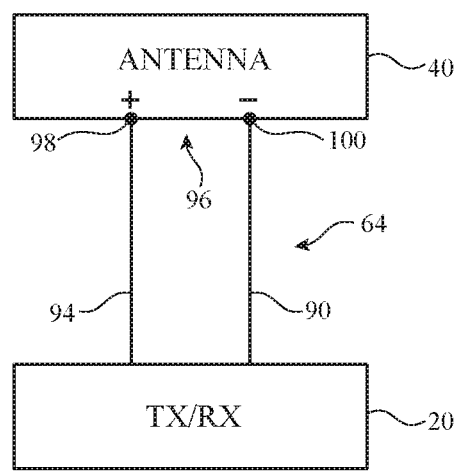
FIG. 4 is a schematic diagram of illustrative wireless communications circuitry in accordance with an embodiment.

A schematic diagram of an antenna 40 that may be formed in phased antenna array 60 (e.g., as antenna 40-1, 40-2, 40-3, and/or 40-N in phased antenna array 60 of FIG. 3) is shown in FIG. 4. As shown in FIG. 4, antenna 40 may be coupled to transceiver circuitry 20 (e.g., millimeter wave transceiver circuitry 28 of FIG. 2). Transceiver circuitry 20 may be coupled to antenna feed 96 of antenna 40 using transmission line path 64 (sometimes referred to herein as radio-frequency transmission line 64). Antenna feed 96 may include a positive antenna feed terminal such as positive antenna feed terminal 98 and may include a ground antenna feed terminal such as ground antenna feed terminal 100. Transmission line path 64 may include a positive signal conductor such as signal conductor 94 that is coupled to terminal 98 and a ground conductor such as ground conductor 90 that is coupled to terminal 100.

Any desired antenna structures may be used for implementing antenna 40. In one suitable arrangement that is sometimes described herein as an example, patch antenna structures may be used for implementing antenna 40. Antennas 40 that are implemented using patch antenna structures may sometimes be referred to herein as patch antennas. An illustrative patch antenna that may be used in phased antenna array 60 of FIG. 3 is shown in FIG. 5.

Figure 5:
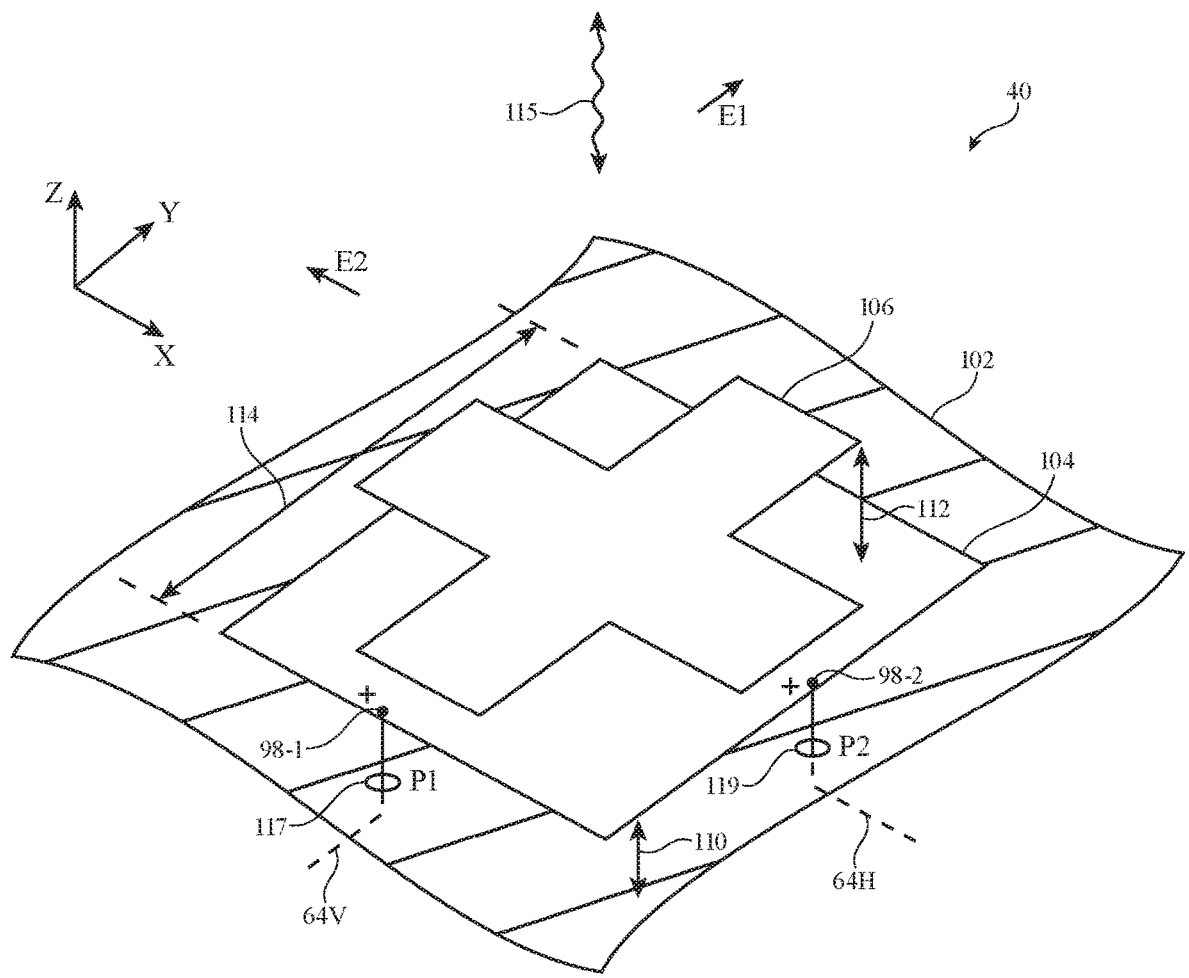
FIG. 5 is a perspective view of an illustrative patch antenna having a parasitic element in accordance with an embodiment.

As shown in FIG. 5, antenna 40 may have a patch antenna resonating element 104 that is separated from and parallel to a ground plane such as antenna ground plane 102. Patch antenna resonating element 104 may lie within a plane such as the X-Y plane of FIG. 5 (e.g., the lateral surface area of element 104 may lie in the X-Y plane). Patch antenna resonating element 104 may sometimes be referred to herein as patch 104, patch element 104, patch resonating element 104, antenna resonating element 104, or resonating element 104. Ground plane 102 may lie within a plane that is parallel to the plane of patch element 104. Patch element 104 and ground plane 102 may therefore lie in separate parallel planes that are separated by a distance 110. Patch element 104 and ground plane 102 may be formed from conductive traces patterned on a dielectric substrate such as a rigid or flexible printed circuit board substrate, metal foil, stamped sheet metal, electronic device housing structures, or any other desired conductive structures.

The length of the sides of patch element 104 may be selected so that antenna 40 resonates at a desired operating frequency. For example, the sides of patch element 104 may each have a length 114 that is approximately equal to half of the wavelength of the signals conveyed by antenna 40 (e.g., the effective wavelength given the dielectric properties of the materials surrounding patch element 104). In one suitable arrangement, length 114 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 5 is merely illustrative. Patch element 104 may have a square shape in which all of the sides of patch element 104 are the same length or may have a different rectangular shape. Patch element 104 may be formed in other shapes having any desired number of straight and/or curved edges. If desired, patch element 104 and ground plane 102 may have different shapes and relative orientations.

To enhance the polarizations handled by antenna 40, antenna 40 may be provided with multiple feeds. As shown in FIG. 5, antenna 40 may have a first feed at antenna port P1 that is coupled to a first transmission line path 64 such as transmission line path 64V and a second feed at antenna port P2 that is coupled to a second transmission line path 64 such as transmission line path 64H. The first antenna feed may have a first ground feed terminal coupled to ground plane 102 (not shown in FIG. 5 for the sake of clarity) and a first positive feed terminal 98-1 coupled to patch element 104. The second antenna feed may have a second ground feed terminal coupled to ground plane 102 (not shown in FIG. 5 for the sake of clarity) and a second positive feed terminal 98-2 on patch element 104.

Holes or openings such as openings 117 and 119 may be formed in ground plane 102. Transmission line path 64V may include a vertical conductor (e.g., a conductive through-via, conductive pin, metal pillar, solder bump, combinations of these, or other vertical conductive interconnect structures) that extends through hole 117 to positive antenna feed terminal 98-1 on patch element 104. Transmission line path 64H may include a vertical conductor that extends through hole 119 to positive antenna feed terminal 98-2 on patch element 104. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first polarization (e.g., the electric field E1 of antenna signals 115 associated with port P1 may be oriented parallel to the Y-axis in FIG. 5). When using the antenna feed associated with port P2, antenna 40 may transmit and/or receive radio-frequency signals having a second polarization (e.g., the electric field E2 of antenna signals 115 associated with port P2 may be oriented parallel to the X-axis of FIG. 5 so that the polarizations associated with ports P1 and P2 are orthogonal to each other).

One of ports P1 and P2 may be used at a given time so that antenna 40 operates as a single-polarization antenna or both ports may be operated at the same time so that antenna 40 operates with other polarizations (e.g., as a dual-polarization antenna, a circularly-polarized antenna, an elliptically-polarized antenna, etc.). If desired, the active port may be changed over time so that antenna 40 can switch between covering vertical or horizontal polarizations at a given time. Ports P1 and P2 may be coupled to different phase and magnitude controllers 62 (FIG. 3) or may both be coupled to the same phase and magnitude controller 62. If desired, ports P1 and P2 may both be operated with the same phase and magnitude at a given time (e.g., when antenna 40 acts as a dual-polarization antenna). If desired, the phases and magnitudes of radio-frequency signals conveyed over ports P1 and P2 may be controlled separately and varied over time so that antenna 40 exhibits other polarizations (e.g., circular or elliptical polarizations).

If care is not taken, antennas 40 such as dual-polarization patch antennas of the type shown in FIG. 5 may have insufficient bandwidth for covering an entirety of a communications band of interest (e.g., a communications band at frequencies greater than 10 GHz). For example, in scenarios where antenna 40 is configured to cover a millimeter wave communications band between 57 GHz and 71 GHz, patch element 104 as shown in FIG. 5 may have insufficient bandwidth to cover the entirety of the frequency range between 57 GHz and 71 GHz. If desired, antenna 40 may include one or more parasitic antenna resonating elements that serve to broaden the bandwidth of antenna 40.

As shown in FIG. 5, a bandwidth-widening parasitic antenna resonating element such as parasitic antenna resonating element 106 may be formed from conductive structures located at a distance 112 over patch element 104. Parasitic antenna resonating element 106 may sometimes be referred to herein as parasitic resonating element 106, parasitic antenna element 106, parasitic element 106, parasitic patch 106, parasitic conductor 106, parasitic structure 106, parasitic 106, or patch 106. Parasitic element 106 is not directly fed, whereas patch element 104 is directly fed via transmission line paths 64V and 64H and antenna feed terminals 98-1 and 98-2. Parasitic element 106 may create a constructive perturbation of the electromagnetic field generated by patch element 104, creating a new resonance for antenna 40. This may serve to broaden the overall bandwidth of antenna 40 (e.g., to cover the entire millimeter wave frequency band from 57 GHz to 71 GHz).

At least some or an entirety of parasitic element 106 may overlap patch element 104. In the example of FIG. 5, parasitic element 106 has a cross or "X" shape. In order to form the cross shape, parasitic element 106 may include notches or slots formed by removing conductive material from the corners of a square or rectangular metal patch. Parasitic element 106 may have a rectangular (e.g., square) outline or footprint. Removing conductive material from parasitic element 106 to form a cross shape may serve to adjust the impedance of patch element 104 so that the impedance of patch element 104 is matched to both transmission line paths 64V and 64H, for example. The example of FIG. 5 is merely illustrative. If desired, parasitic element 106 may have other shapes or orientations.

If desired, antenna 40 of FIG. 5 may be formed on a dielectric substrate (not shown in FIG. 5 for the sake of clarity). The dielectric substrate may be, for example, a rigid or printed circuit board or other dielectric substrate. The dielectric substrate may include multiple stacked dielectric layers (e.g., multiple layers of printed circuit board substrate such as multiple layers of fiberglass-filled epoxy, multiple layers of ceramic substrate, etc.). Ground plane 102, patch element 104, and parasitic element 106 may be formed on different layers of the dielectric substrate if desired.

When configured in this way, antenna 40 may cover a relatively wide millimeter wave communications band of interest such as a frequency band between 57 GHz and 71 GHz. The example of FIG. 5 is merely illustrative. Parasitic element 106 may be omitted if desired. Antenna 40 may have any desired number of feeds. Other antenna types may be used if desired.

Figure 6:
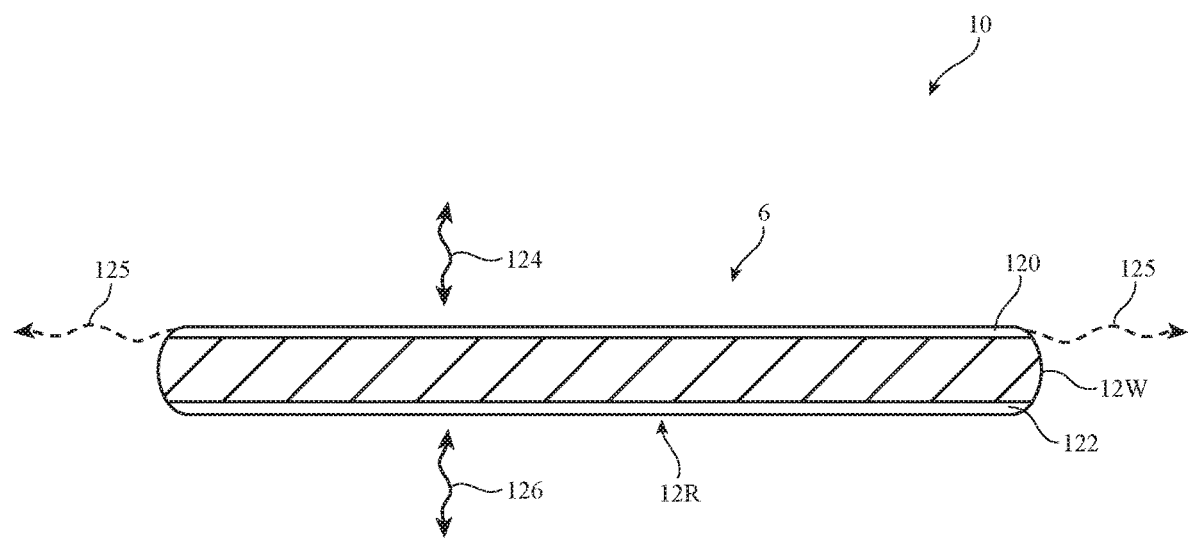
FIG. 6 is a side view of an illustrative electronic device having dielectric cover layers at front and rear faces in accordance with an embodiment.

FIG. 6 is a cross-sectional side view of device 10 showing how phased antenna array 60 (FIG. 3) may convey radio-frequency signals through a dielectric cover layer for device 10. The plane of the page of FIG. 6 may, for example, lie in the Y-Z plane of FIG. 1.

As shown in FIG. 6, peripheral conductive structures 12W may extend around the periphery of device 10. Peripheral conductive structures 12W may extend across the height (thickness) of device 10 from a first dielectric cover layer such as dielectric cover layer 120 to a second dielectric cover layer such as dielectric cover layer 122. Dielectric cover layers 120 and 122 may sometimes be referred to herein as dielectric covers, dielectric layers, dielectric walls, or dielectric housing walls. If desired, dielectric cover layer 120 may extend across the entire lateral surface area of device 10 and may form a first face of device 10. Dielectric cover layer 122 may extend across the entire lateral surface area of device 10 and may form a second face of device 10.

In the example of FIG. 6, dielectric cover layer 122 forms a part of rear housing wall 12R for device 10 whereas dielectric cover layer 120 forms a part of display 6 (e.g., a display cover layer for display 6). Active circuitry in display 6 may emit light through dielectric cover layer 120 and may receive touch or force input from a user through dielectric cover layer 120. Dielectric cover layer 122 may form a thin dielectric layer or coating over a conductive portion of rear housing wall 12R (e.g., a conductive backplate or other conductive layer that extends across substantially all of the lateral area of device 10). Dielectric cover layers 120 and 122 may be formed from any desired dielectric materials such as glass, plastic, sapphire, ceramic, etc.

Conductive structures such as peripheral conductive housing structures 12W may block electromagnetic energy conveyed by phased antenna arrays in device 10 such as phased antenna array 60 of FIG. 3. In order to allow radio-frequency signals to be conveyed with wireless equipment external to device 10, phased antenna arrays such as phased antenna array 60 may be mounted behind dielectric cover layer 120 and/or dielectric cover layer 122.

When mounted behind dielectric cover layer 120, phased antenna array 60 may transmit and receive wireless signals (e.g., wireless signals at millimeter and centimeter wave frequencies) such as radio-frequency signals 124 through dielectric cover layer 120. When mounted behind dielectric cover layer 122, phased antenna array 60 may transmit and receive wireless signals such as radio-frequency signals 126 through dielectric cover layer 120.

In practice, radio-frequency signals at millimeter and centimeter wave frequencies such as radio-frequency signals 124 and 126 may be subject to substantial attenuation, particularly through relatively dense mediums such as dielectric cover layers 120 and 122. The radio-frequency signals may also be subject to destructive interference due to reflections within dielectric cover layers 120 and 122 and may generate undesirable surface waves at the interfaces between dielectric cover layers 120 and 122 and the interior of device 10. For example, radio-frequency signals conveyed by a phased antenna array 60 mounted behind dielectric cover layer 120 may generate surface waves at the interior surface of dielectric cover layer 120. If care is not taken, the surface waves may propagate laterally outward (e.g., along the interior surface of dielectric cover layer 120) and may escape out the sides of device 10, as shown by arrows 125. Surface waves such as these may reduce the overall antenna efficiency for the phased antenna array, may generate undesirable interference with external equipment, and may subject the user to undesirable radio-frequency energy absorption, for example. Similar surface waves may also be generated at the interior surface of dielectric cover layer 122.

Figure 7:
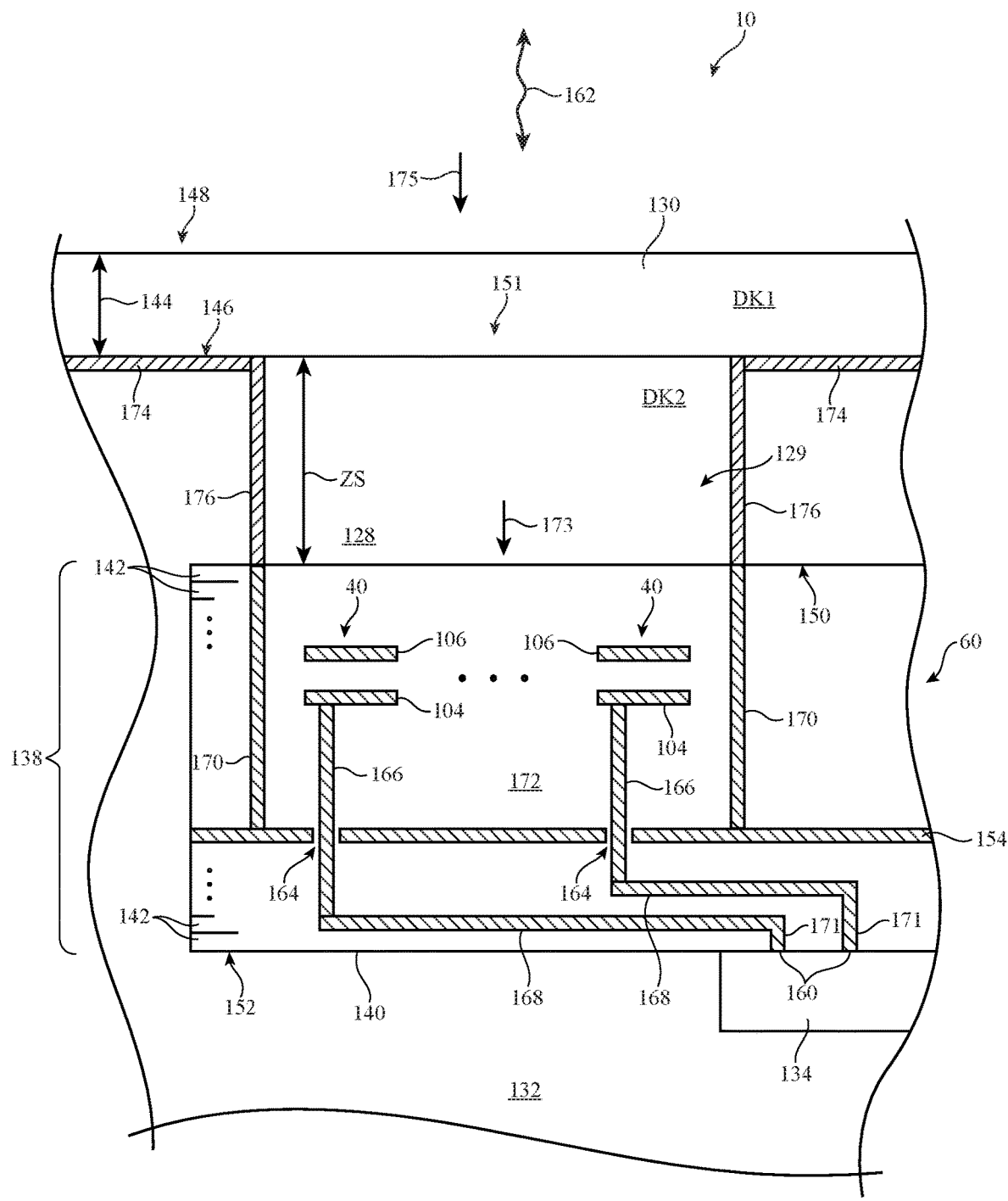
FIG. 7 is a cross-sectional side view of an illustrative phased antenna array that may be mounted against a dielectric cover layer in an electronic device in accordance with an embodiment.

FIG. 7 is a cross-sectional side view of device 10 showing how phased antenna array 60 may be implemented within device 10 to mitigate these issues. As shown in FIG. 7, phased antenna array 60 may be formed on a dielectric substrate such as substrate 140 mounted within interior 132 of device 10 and against dielectric cover layer 130.

Phased antenna array 60 may include multiple antennas 40 (e.g., stacked patch antennas of the type shown in FIG. 5). The antennas 40 in phased antenna array 60 may be arranged in a grid of rows and columns (e.g., a one or two-dimensional array). Dielectric cover layer 130 may form a dielectric rear wall for device 10 (e.g., dielectric cover layer 130 of FIG. 7 may form dielectric cover layer 122 of FIG. 6) or may form a display cover layer for device 10 (e.g., dielectric cover layer 130 of FIG. 7 may form dielectric cover layer 120 of FIG. 6), as examples. Dielectric cover layer 130 may be formed from a visually opaque material or may be provided with pigment so that dielectric cover layer 130 is visually opaque.

Substrate 140 may be, for example, a rigid or flexible printed circuit board or other dielectric substrate. Substrate 140 may include multiple stacked dielectric layers 142 (e.g., multiple layers of printed circuit board substrate such as multiple layers of fiberglass-filled epoxy) or may include a single dielectric layer. Substrate 140 may include any desired dielectric materials such as epoxy, plastic, ceramic, glass, foam, or other materials. Antennas 40 in phased array antenna 60 may be mounted at a surface of substrate 140 or may be partially or completely embedded within substrate 140 (e.g., within a single layer of substrate 140 or within multiple layers of substrate 140).

In the example of FIG. 7, antennas 40 in phased antenna array 60 include a ground plane (e.g., ground plane 102 of FIG. 5) and patch elements 104 that are embedded within layers 142 of substrate 140. The ground plane for phased antenna array 60 may be formed from conductive traces 154 within substrate 140, for example. Antennas 40 in phased antenna array 60 may include parasitic elements 106 (e.g., cross-shaped parasitic elements as shown in FIG. 5) that are interposed between surface 150 of substrate 140 and patch elements 104. If desired, parasitic elements 106 may be formed at (on) surface 150 of substrate 140. For example, parasitic elements 106 may be formed from conductive traces on the top-most layer 142 of substrate 140. In yet another suitable arrangement, parasitic elements 106 may be omitted and, if desired, patch elements 104 may be formed at (on) surface 150 of substrate 140. For example, patch elements 104 may be formed from conductive traces on the top-most layer 142 of substrate 140.

Substrate 140 may be mounted to (against) dielectric cover layer 130 but separated from interior surface 146 of dielectric cover layer 130 by an interposing dielectric spacer 128. Dielectric spacer 128 may sometimes be referred to herein as dielectric substrate 128 or dielectric interposer 128. Dielectric spacer 128 may be formed from plastic, epoxy, ceramic, glass, or any other desired dielectric materials. Dielectric spacer 128 may have an upper surface that is in direct contact with interior surface 146 of dielectric cover layer 130 and a lower surface that is in direct contact with surface 150 of substrate 140. If desired, conductive traces in phased antenna array 60 (e.g., conductive traces used to form patch elements 104 and/or parasitic elements 106) may be in direct contact with dielectric spacer 128. This is merely illustrative and, if desired, dielectric spacer 128 may be attached to interior surface 146 of dielectric cover layer 130 and/or surface 150 of substrate 140 using layers of adhesive.

A conductive layer 174 may be formed on interior surface 146 of dielectric cover layer 130. Conductive layer 174 may, for example, form a conductive portion of rear housing wall 12R (FIGS. 1 and 6). Conductive layer 174 may extend across substantially all of the lateral area of device 10 if desired. Conductive layer 174 may be formed from an integral piece of metal with peripheral conductive structures 12W (FIGS. 1 and 6) if desired. Conductive layer 174 may be held at a ground potential or other reference potential and may serve as a part of the antenna ground for phased antenna array 60.

Figure 9:
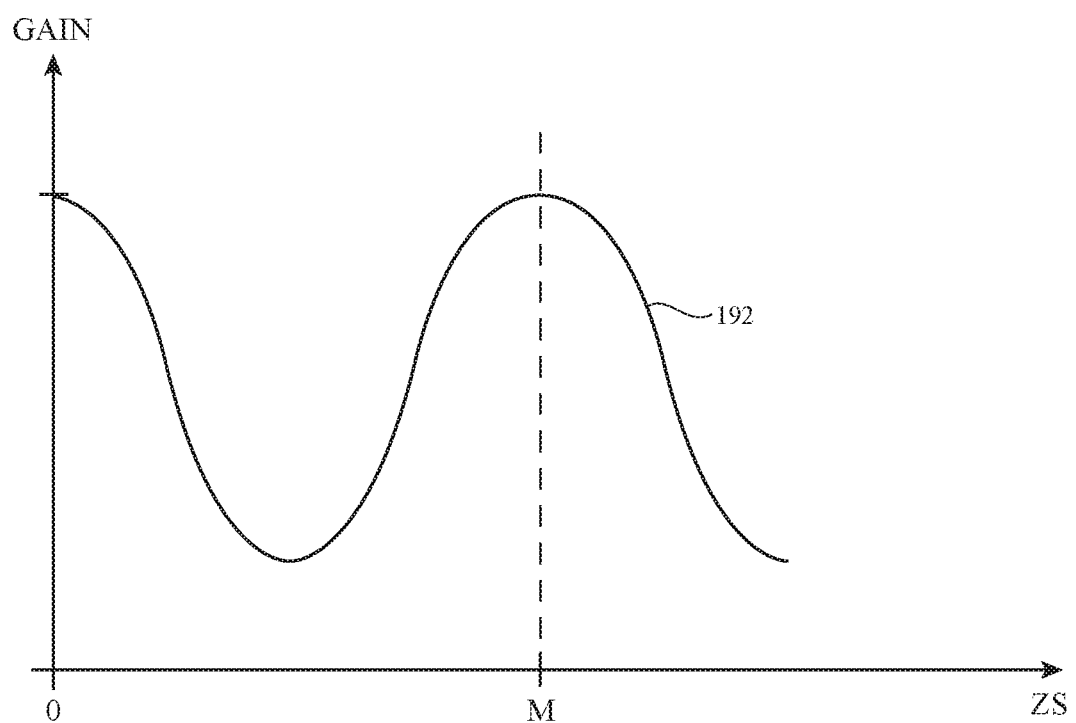
FIG. 9 is a graph of illustrative antenna performance (antenna gain) as a function of the thickness of a dielectric spacer interposed between a phased antenna array and a dielectric cover layer in accordance with an embodiment.

Phased array antenna 60 and substrate 140 may sometimes be referred to herein collectively as antenna module 138. If desired, transceiver circuitry 134 (e.g., transceiver circuitry 28 of FIG. 2) or other transceiver circuits may be mounted to antenna module 138 (e.g., at surface 152 of substrate 140 or embedded within substrate 140). While FIG. 9 shows two antennas 40, this is merely illustrative. In general, any desired number of antennas 40 may be formed in phased antenna array 60. The example of antennas 40 being patch antennas is merely illustrative. Patch elements 104 may be replaced by dipole resonating elements, Yagi antenna resonating elements, slot antenna resonating elements, or any other desired antenna resonating elements of antennas of any desired type.

Conductive traces 154 may sometimes be referred to herein as ground traces 154, ground plane 154, antenna ground 154, or ground plane traces 154. The layers 142 in substrate 140 between ground traces 154 and dielectric cover layer 130 may sometimes be referred to herein as antenna layers. The layers in substrate 140 between ground traces 154 and surface 152 of substrate 140 may sometimes be referred to herein as transmission line layers. The antenna layers may be used to support patch elements 104 and parasitic elements 106 of the antennas 40 in phased antenna array 60. The transmission line layers may be used to support transmission line paths (e.g., transmission line paths 64V and 64H of FIG. 5) for phased antenna array 60.

Transceiver circuitry 134 may include transceiver ports 160. Each transceiver port 160 may be coupled to a respective antenna 40 over one or more corresponding transmission line paths 64 (e.g., transmission line paths such as transmission line paths 64H and 64V of FIG. 5). Transceiver ports 160 may include conductive contact pads, solder balls, microbumps, conductive pins, conductive pillars, conductive sockets, conductive clips, welds, conductive adhesive, conductive wires, interface circuits, or any other desired conductive interconnect structures.

Transmission line paths 64 for antennas 40 may be embedded within the transmission line layers of substrate 140. Transmission line paths 64 may include conductive traces 168 within the transmission line layers of substrate 140 (e.g., conductive traces on one or more dielectric layers 142 within substrate 140). Conductive traces 168 may form signal conductor 94 and/or ground conductor 90 (FIG. 4) of one, more than one, or all of transmission line paths 64 for the antennas 40 in phased antenna array 60. If desired, additional grounded traces within the transmission line layers of substrate 140 and/or portions of ground traces 154 may form ground conductor 90 (FIG. 4) for one or more transmission line paths 64.

Conductive traces 168 may be coupled to the positive antenna feed terminals of antennas 40 (e.g., positive antenna feed terminals 98-1 and 98-2 of FIG. 5) over vertical conductive structures 166. Conductive traces 168 may be coupled to transceiver ports 160 over vertical conductive structures 171. Vertical conductive structures 166 may extend through a portion of the transmission line layers of substrate 140, holes or openings 164 in ground traces 154 (e.g., holes such as holes 117 and 119 of FIG. 5), and the antenna layers in substrate 140 to patch elements 104. Vertical conductive structures 171 may extend through a portion of the transmission line layers in substrate 140. Vertical conductive structures 166 and 171 may include conductive through-vias, metal pillars, metal wires, conductive pins, or any other desired vertical conductive interconnects. While the example of FIG. 7 shows only a single vertical conductive structure coupled to a single positive antenna feed terminal on each patch element 140, patch elements 104 may be fed using multiple positive antenna feed terminals and vertical conductive structures if desired. For example, each antenna 40 in phased antenna array 60 may have positive antenna feed terminals 98-1 and 98-2 (FIG. 5) coupled to respective traces 168 over corresponding vertical conductive structures 166 (e.g., for covering multiple different polarizations).

In order to allow radio-frequency signals transmitted by phased antenna array 60 to exit interior 132 of device 10, conductive layer 174 (sometimes referred to herein as conductive rear housing wall 174) may have an opening such as opening 151 (sometimes referred to herein as slot 151, aperture 151, or gap 151). Opening 151 may be aligned with phased antenna array 60 on substrate 140 (e.g., the lateral periphery of phased antenna array 60 may lie within the lateral footprint of opening 151). As shown in FIG. 7, opening 151 in conductive layer 174 may be aligned with dielectric spacer 128 (e.g., the lateral periphery of dielectric spacer 128 may follow the lateral periphery of opening 151). Dielectric spacer 128 may contact interior surface 146 of display cover layer 130 within opening 151 in conductive layer 174.

Conductive structures such as vertical conductive structures 176 may extend from conductive layer 174 at the periphery of opening 151 to surface 150 of substrate 140. Vertical conductive structures 176 may completely surround opening 151 at interior surface 146, for example. If desired, vertical conductive structures 176 may include conductive structures that have been galvanically connected to conductive layer 174 (e.g., using welds, solder, conductive screws, conductive pins, conductive adhesive, or other conductive interconnect structures) such as stamped sheet metal, metal traces, conductive device components. In another suitable arrangement, vertical conductive structures 176 may include conductive portions of housing 12 (FIG. 1) such as integral portions of conductive layer 174 that have been bent downwards towards antenna module 138.

Vertical conductive structures 176 may cover the vertical sidewalls of dielectric spacer 128 and may, if desired, laterally surround all sides of dielectric spacer 128. In other words, dielectric spacer 128 may be completely surrounded and enclosed by surface 150 of substrate 140, vertical conductive structures 176, and interior surface 146 of dielectric cover layer 130. In this way, dielectric spacer 128, vertical conductive structures 176, and opening 151 in conductive layer 174 may form an aperture 129 that is aligned with phased antenna array 60.

Aperture 129 (sometimes referred to herein as cavity 129 or volume 129) may allow radio-frequency signals such as radio-frequency signals 162 to be conveyed to and from phased antenna array 60 without the radio-frequency signals being blocked by conductive layer 174. If desired, aperture 129 may have dimensions that configure aperture 129 to exhibit one or more resonant cavity modes. Radio-frequency signals conveyed by phased antenna array 60 may excite the resonant cavity modes of aperture 129 (sometimes referred to herein as cavity resonances) to cause aperture 129 to radiate radio-frequency signals 162. In this way, phased antenna array 60 may serve as a probe that excites aperture 129 to radiate signals 162 if desired (e.g., aperture 129 may serve as a radiating waveguide for phased antenna array 60).

If desired, antenna module 138 may be affixed or attached to dielectric spacer 128 and/or vertical conductive structures 176 using adhesive, screws, pins, springs, welds, solder, tape, or any other desired interconnect structures. If desired, vertical conductive structures 176 may be soldered or welded to conductive traces on surface 150 of substrate 140 and/or to vertical conductive structures within substrate 140 such as conductive through vias 170 (e.g., to help hold antenna module 138 in place on dielectric spacer 128 and in alignment with aperture 129). For example, conductive through vias 170 (sometimes referred to herein as conductive vias 170) may be aligned with and attached to vertical conductive structures 176 (at surface 150 of substrate 140).

If care is not taken, radio-frequency signals transmitted by phased antenna array 60 and aperture 129 may reflect off of interior surface 146 of dielectric cover layer 130. The radio-frequency signals transmitted by phased antenna array 60 and aperture 129 may also reflect within dielectric cover layer 130 (e.g., at interior surface 146 and exterior surface 148 of dielectric cover layer 130). Such reflections may, for example, be due to the difference in dielectric constant between dielectric cover layer 130 and the space external to device 10 as well as the difference in dielectric constant between dielectric spacer 128 and dielectric cover layer 130. If care is not taken, the reflected signals may destructively interfere with each other and/or with the signals transmitted by phased antenna array 60 and aperture 129 (e.g., within dielectric cover layer 130 and/or dielectric spacer 128). This may lead to a deterioration in antenna gain for phased antenna array 60 over some angles, for example.

If desired, the dimensions and dielectric properties of dielectric cover layer 130 and dielectric spacer 128 may be selected to mitigate these issues. For example, dielectric constant DK1 of dielectric cover layer 130 and thickness 144 of dielectric cover layer 130 may be selected so that dielectric cover layer 130 forms a quarter wave impedance transformer for phased antenna array 60 and aperture 129. When configured in this way, dielectric cover layer 130 may optimize matching of the antenna impedance for phased antenna array 60 to the free space impedance external to device 10 and may mitigate destructive interference within dielectric cover layer 130.

As examples, dielectric cover layer 130 may be formed of a material having a dielectric constant between about 3.0 and 10.0 (e.g., between 4.0 and 9.0, between 5.0 and 8.0, between 5.5 and 7.0, etc.). In one particular arrangement, dielectric cover layer 130 may be formed from glass, ceramic, or other dielectric materials having a dielectric constant of about 6.0. Thickness 144 of dielectric cover layer 130 may be selected to be between 0.15 and 0.25 times the effective wavelength of operation of phased antenna array 60 in the material used to form dielectric cover layer 130 (e.g., approximately one-quarter of the effective wavelength). The effective wavelength is given by dividing the free space wavelength of operation of phased antenna array 60 (e.g., a centimeter or millimeter wavelength corresponding to a frequency between 10 GHz and 300 GHz) by a constant factor (e.g., the square root of dielectric constant DK1 of the material used to form dielectric cover layer 130). This example is merely illustrative and, if desired, thickness 144 may be selected to be between 0.17 and 0.23 times the effective wavelength, between 0.12 and 0.28 times the effective wavelength, between 0.19 and 0.21 times the effective wavelength, between 0.15 and 0.30 times the effective wavelength, etc. In practice, thickness 144 may be between 0.8 mm and 1.0 mm, between 0.85 mm and 0.95 mm, or between 0.7 mm and 1.1 mm, as examples.

Dielectric spacer 128 may be formed from any desired dielectric materials having a dielectric constant DK2 that is less than dielectric constant DK1 of dielectric cover layer 130. For example, dielectric spacer 128 may have a dielectric constant of between 2.0 and 9.0, between 3.0 and 4.0, between 3.5 and 5.5, approximately 3.5, etc. Dielectric spacer 128 may have a thickness ZS that is selected to tune the gain of aperture 129 and phased antenna array 60. For example, thickness ZS of dielectric spacer 128 may be selected to approximately one-half the effective wavelength of operation of phased antenna array 60 in the material used to form dielectric spacer 128 (e.g., between 0.4 and 0.6 times the effective wavelength, between 0.45 and 0.55 times the effective wavelength, between 0.48 and 0.52 times the effective wavelength, etc.). This effective wavelength is given by dividing the free space wavelength of operation of phased antenna array 60 by the square root of dielectric constant DK2 of the material used to form dielectric spacer 128). Because dielectric constant DK2 is less than dielectric constant DK1, the effective wavelength of operation of phased antenna array 60 in dielectric spacer 128 may be greater than that in dielectric cover layer 130. When configured in this way, destructive interference associated with reflections at surfaces 146 and 148 may be minimized within dielectric cover layer 130 and aperture 129, thereby maximizing antenna gain for aperture 129 and phased antenna array 60.

Vertical conductive structures such as fences of conductive vias 170 may laterally surround phased antenna array 60 in substrate 140. Conductive vias 170 may extend through substrate 140 from surface 150 to ground traces 154. Conductive landing pads (not shown in FIG. 7 for the sake of clarity) may be used to secure conductive vias 170 to each layer 142 as the conductive vias pass through substrate 140. Vertical conductive structures 176 may be shorted to ground traces 154 through conductive vias 170 (e.g., solder or other material may be used to conductively couple vertical conductive structures 176 to conducive vias 170 at surface 150 of substrate 140). In this way, conductive layer 174, vertical conductive structures 176, conductive vias 170, and ground traces 154 may all be held at a ground or reference potential for forming a part of the antenna support structure for phased antenna array 60 (e.g., ground plane 102 of FIG. 5).

As shown in FIG. 7, the patch element 104 and parasitic element 106 for each antenna 40 in phased antenna 60 may be mounted within a volume 172 of substrate 140 (sometimes referred to herein as cavity 172). The edges of cavity 172 may be defined by conductive vias 170 and ground traces 154. Cavity 172 may be continuous with aperture 129 so that aperture 129 and cavity 172 form a single continuous cavity surrounded by conductive material held at a ground potential (e.g., vertical conductive structures 176, fences of conductive vias 170, and ground traces 154).

The conductive cavity formed from ground traces 154 and conductive vias 170 may help to direct radio-frequency signals transmitted by phased antenna array 60 towards aperture 129. Phased antenna array 60 may excite cavity resonances of aperture 129 that enhance the gain of phased antenna array 60 relative to scenarios where aperture 129 is omitted. This may, for example, help to compensate for signal attenuation and destructive interference associated with the presence of dielectric cover layer 130 above phased antenna array 60. Conductive vias 170 may also serve to isolate the phased antenna array 60 from other components within device 10 if desired.

In practice, phased antenna array 60 may generate surface waves at interior surface 146 of dielectric cover layer 130 (e.g., surface waves such as surface waves 125 of FIG. 6). However, the presence of conductive layer 174, vertical conductive structures 176, and conductive vias 170 may serve to block the surface waves from propagating out of aperture 129, interfering with external equipment, being absorbed by the user, etc. In this way, phased antenna array 60 may transmit and receive radio-frequency signals 162 at millimeter and centimeter wave frequencies through dielectric cover layer 130 while minimizing reflective losses, destructive interference, and surface wave effects associated with the presence of dielectric cover layer 130.

Figure 8:
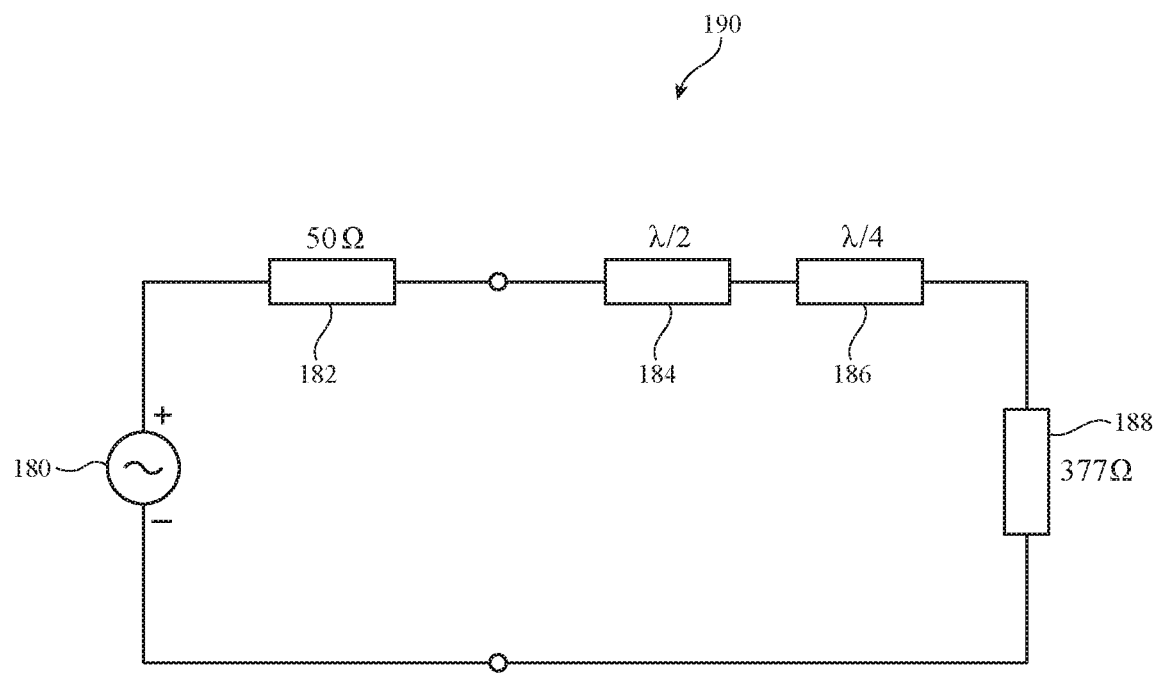
FIG. 8 is a transmission line model for an illustrative phased antenna array mounted against a dielectric cover layer of the type shown in FIG. 7 in accordance with an embodiment.

FIG. 8 shows an exemplary transmission line model 190 illustrating how phased antenna array 60 of FIG. 7 may interface with the environment around device 10 through dielectric cover layer 130 and dielectric spacer 128. As shown in FIG. 8, transceiver 180 (e.g., transceiver circuitry 28 of FIG. 2) may be coupled to antenna load 182 (e.g., a 50 Ohm impedance associated with a given antenna 40 in phased antenna array 60).

Load 184 associated with dielectric spacer 128 of FIG. 7 may be coupled in series with load 186 associated with dielectric cover layer 130 between antenna load 182 and free space load 188. Free space load 188 may be associated with the space above dielectric cover layer 130 and external to device 10 (e.g., 377 Ohms or another suitable free space impedance). By forming dielectric cover layer 130 with a suitable dielectric constant DK1 and thickness 144, dielectric cover layer 130 may form a quarter wave impedance transformer (e.g., where thickness 144 is approximately equal to a quarter of the effective wavelength of operation of antenna 40 given the dielectric constant DK1 of dielectric cover layer 130). Forming dielectric cover layer 130 as a quarter wave impedance transformer and forming dielectric spacer 128 with a suitable dielectric constant DK2 and thickness ZS may allow antenna load 182 (antenna 40 of FIG. 7) to interface with free space load 188 while minimizing destructive interference and signal attenuation within dielectric cover layer 130 and aperture 129 at the wavelength of operation of antenna 40, for example. The example of FIG. 8 is merely illustrative and in general, other transmission line models may be used to model the impedances associated with phased antenna array 60.

FIG. 9 is a plot of antenna performance (antenna gain) for phased antenna array 60 as a function of the thickness ZS of dielectric spacer 128 (FIG. 7). As shown by curve 192 of FIG. 9, phased antenna array 60 may exhibit a peak antenna gain when dielectric spacer 128 has a thickness of zero (e.g., in scenarios where dielectric spacer 128 is omitted). In these scenarios, parasitic elements 106 or patch elements 104 of phased antenna array 60 (FIG. 7) may be pressed directly against (e.g., in direct contact with) interior surface 146 of dielectric cover layer 130. This may minimize reflections between substrate 140 and interior surface 146 and corresponding destructive interference, thereby serving to maximize antenna gain. However, pressing the conductive components of phased antenna array 60 directly against interior surface 146 of dielectric cover layer 130 may generate a greater amount of surface waves than in scenarios where dielectric spacer 128 is used. Such an increase in surface wave energy may limit the placement of phased antenna array 60 within device 10 to locations that are relatively far away from the peripheral edges of device 10 (e.g., so that the surface waves generated by each antenna in the array have space to cancel out with each other before propagating beyond device 10). Separating phased antenna array 60 from dielectric cover layer 130 by dielectric spacer 128 may trap the surface waves within aperture 129 (FIG. 7), thereby allowing greater flexibility in the placement of phased antenna array across the lateral face of device 10, for example.

As shown by curve 192 of FIG. 9, the gain of phased antenna array 60 decreases as thickness ZS of dielectric spacer 128 increases from zero (e.g., due to increasing signal reflections at interior surface 146 of dielectric cover layer 130). However, the gain exhibits another maximum at optimal thickness M. At optimal thickness M, reflected signals within aperture 129 may constructively interfere, thereby allowing phased antenna array 60 to exhibit sufficient gain. Optimal thickness M may be, for example, approximately one-half the effective wavelength of operation of phased antenna array 60 in the material used to form dielectric spacer 128 (e.g., between 0.4 and 0.6 times the effective wavelength, between 0.45 and 0.55 times the effective wavelength, between 0.48 and 0.52 times the effective wavelength, more than twice thickness 144 of FIG. 7, etc.). The example of FIG. 9 is merely illustrative and, in general, curve 192 may have other shapes.

Figure 10:
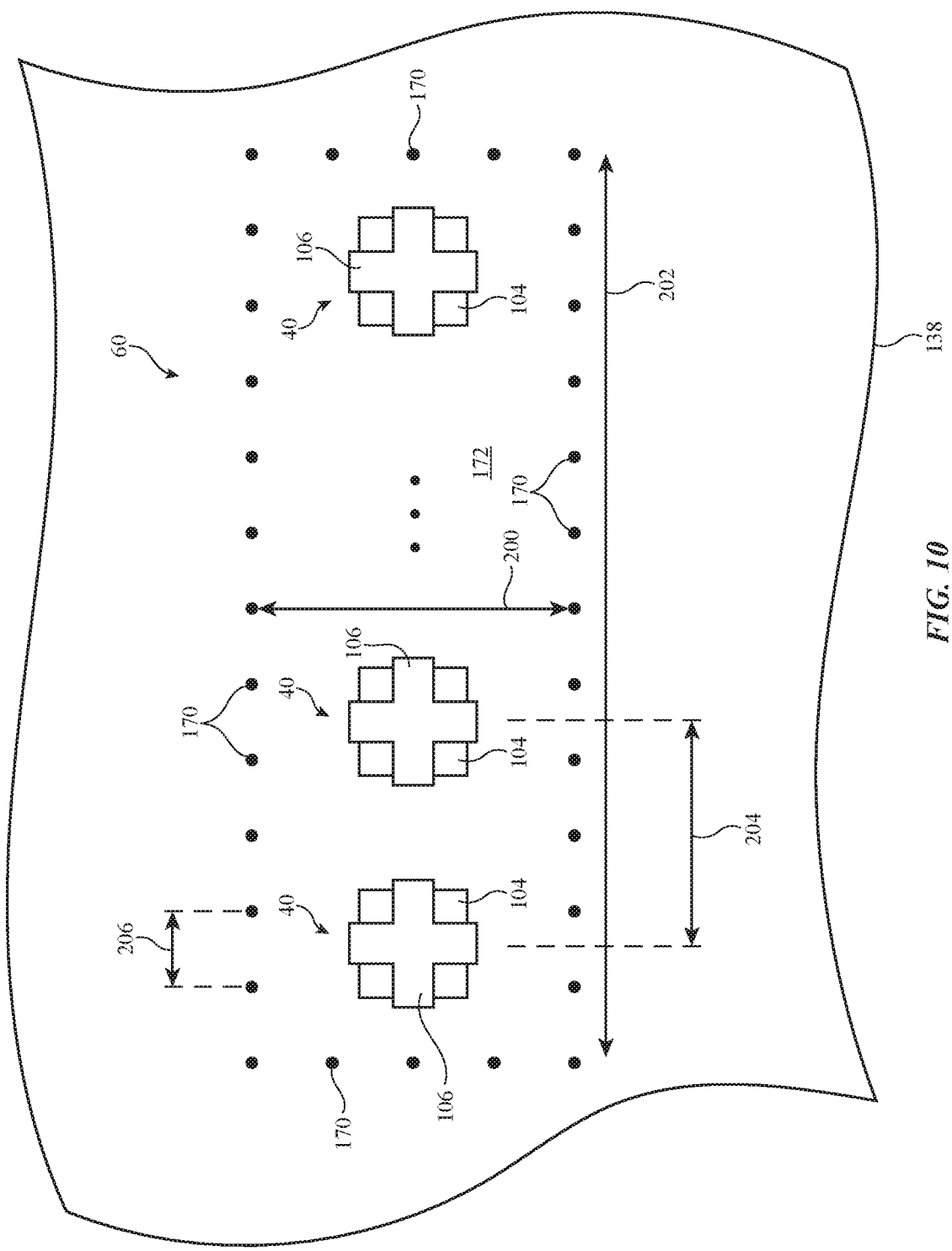
FIG. 10 is a top-down view of an illustrative phased antenna array having fences of conductive vias that laterally surround the antennas in the phased antenna array in accordance with an embodiment.

FIG. 10 is a top-down view of phased antenna array 60 (e.g., as taken in the direction of arrow 173 of FIG. 7). In the example of FIG. 10, dielectric cover layer 130, dielectric spacer 128, ground traces 154, conductive traces 168, and substrate 140 of FIG. 7 are omitted for the sake of clarity.

As shown in FIG. 10, phased antenna array 60 on antenna module 138 may include multiple antennas 40 arranged in a selected pattern. In the example of FIG. 10, phased antenna array 60 includes a single row of antennas 40. However, in general, phased antenna array 60 may include any desired number of antennas arranged in any desired pattern.

Phased antenna array 60 may be laterally surrounded by fences of conductive vias 170 (e.g., vias extending into the page and through substrate 140 as shown in FIG. 7). The fences of conductive vias 170 for phased antenna array 60 may be opaque at frequencies covered by antennas 40. As shown in FIG. 10, each conductive via 170 may be separated from two adjacent conductive vias 170 by a distance (pitch) 206. In order to be opaque at frequencies covered by antennas 40, distance 206 may be less than about ⅛ of the wavelength of operation of antennas 40 (e.g., an effective wavelength after compensating for the dielectric effects of substrate 140 of FIG. 7).

Each antenna 40 in phased antenna array 60 may be separated from adjacent antennas 40 in phased antenna array 60 by lateral distance 204. Distance 204 may be, for example, approximately equal to one-half of the wavelength of operation of antennas 40 (e.g., an effective wavelength given the dielectric properties of substrate 140 of FIG. 7).

The fences of conductive vias 170 may surround cavity 172 within antenna module 138. In the example of FIG. 10, cavity 172 has a rectangular shape (e.g., a rectangular periphery, outline, or footprint). The fences of conductive vias 170 may define the four straight edges of cavity 172. Cavity 172 may have a major axis 202 (e.g., a longitudinal axis or longest rectangular dimension of cavity 172 defined by conductive vias 170) and a perpendicular minor axis 200 (e.g., a shortest rectangular dimension of cavity 172 defined by conductive vias 170). The length of axes 202 and 204 may be selected to fit each of the antennas 40 in phased antenna array 60 within cavity 172 and to align with vertical conductive structures 176 (FIG. 7).

The example of FIG. 10 is merely illustrative. Cavity 172 may have any desired outline or shape (e.g., shapes having one or more curved and/or straight edges). Patch elements 104 and parasitic elements 106 may be centered within cavity 172 or may be offset from the center of cavity 172. Parasitic elements 106 may be omitted if desired. Additional layers of stacked parasitic elements and/or patch elements (e.g., antenna resonating elements) may be provided for each antenna 40 if desired. Patch elements 104 and parasitic elements 106 may have any desired shapes and/or orientations. Each antenna 40 may cover the same frequency or, if desired, two or more antennas 40 in phased antenna array 60 may have patch elements 104 of different sizes for covering different frequencies.

Figure 11:
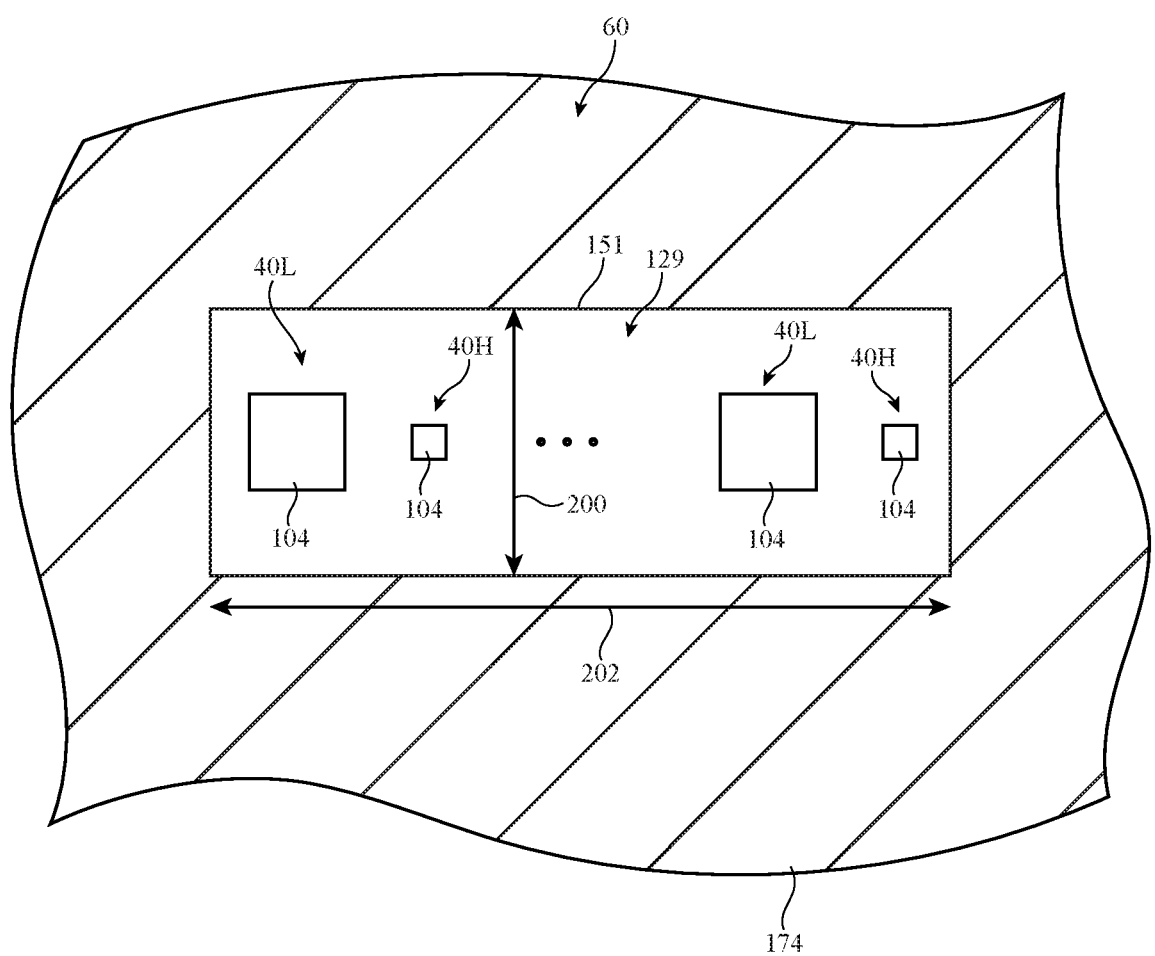
FIG. 11 is a top-down view of an illustrative phased antenna array aligned with an aperture in a conductive layer in accordance with an embodiment.

FIG. 11 is a top-down view of aperture 129 and phased antenna array 60 (e.g., as taken in the direction of arrow 175 of FIG. 7). In the example of FIG. 11, dielectric cover layer 130, dielectric spacer 128, dielectric substrate 140, ground traces 154, and conductive traces 168 of FIG. 7 are omitted for the sake of clarity.

As shown in FIG. 11, conductive layer 174 may include opening 151 that is aligned with the underlying aperture 129 and phased antenna array 60. Vertical conductive structures 176 (FIG. 7) may extend downwards (into the page of FIG. 11) to conductive vias 170 (FIGS. 7 and 10). Vertical conductive structures 176 may extend continuously around all lateral sides of opening 151 and aperture 129 if desired. Aperture 129 may have lateral axes 202 and 200 that align with the lateral axes of cavity 172 on antenna module 138 (FIG. 10). For example, aperture 129 may have a rectangular shape (e.g., a rectangular outline, footprint, or periphery) that aligns with the rectangular shape of the underlying cavity 172 of antenna module 138 (FIG. 1).

The length of axes 202 and 200 may be selected so that aperture 129 exhibits one or more resonant cavity modes. For example, the shortest rectangular dimension of aperture 129 (e.g., the length of minor axis 200) may be selected to be approximately equal to one-half of the effective wavelength of operation of phased antenna array 60 given dielectric constant DK2 of dielectric spacer 128 (e.g., between 0.4 and 0.6 times the effective wavelength, between 0.45 and 0.55 times the effective wavelength, between 0.48 and 0.52 times the effective wavelength, etc.). When configured in this way, electromagnetic standing wave modes associated with the cavity resonances may be excited within aperture 129 by phased antenna array 60, and aperture 129 may radiate corresponding radio-frequency signals through dielectric cover layer 130 (FIG. 7). The resonant cavity modes of aperture 129 may serve to optimize the antenna gain of phased antenna array 60 (e.g., to counteract signal attenuation due to the presence of dielectric cover layer 130 over phased antenna array 60).

If desired, phased antenna array 60 may include different antennas 40 for covering different frequencies. As shown in the example of FIG. 11, phased antenna array 60 may include a first set of antennas 40H for covering relatively high frequencies and a second set of antennas 40L for covering relatively low frequencies (e.g., frequencies between 10 GHz and 300 GHz). Antennas 40H may have relatively small patch elements 104 for covering the relatively high frequencies whereas antennas 40L have relatively large patch elements 104 for covering the relatively low frequencies. Antennas 40L and 40H may be arranged in any desired pattern within phased antenna array 60.

In scenarios such as these where phased antenna array 60 includes different antennas for covering different frequencies, the length of minor axis 200 of aperture 129 (and the underlying cavity 172 of antenna module 138 as shown in FIG. 10) may be selected to be approximately equal to the one-half of the effective wavelength corresponding to the lowest frequency antenna in phased antenna array 60. For example, the length of minor axis 200 may be selected to be approximately one-half the effective wavelength of operation of antennas 40L in the material used to form dielectric spacer 128 (e.g., between 0.4 and 0.6 times the effective wavelength, between 0.45 and 0.55 times the effective wavelength, between 0.48 and 0.52 times the effective wavelength, etc.). This may, for example, ensure that aperture 129 is able to support resonant cavity modes for each of the frequencies handled by phased antenna array 60 even when phased antenna array 60 includes different antennas that cover different frequencies.

The example of FIG. 11 is merely illustrative. If desired, additional antennas 40 may be formed in phased antenna array 60 for covering more than two different frequencies. Aperture 129 may have any desired lateral outline (e.g., aperture 129 may have any desired number of curved and/or straight sides or edges). The patch elements 104 of antennas 40L and 40H may have any desired shapes and/or relative orientations. One or more of antennas 40L and 40H may be provided with parasitic elements such as parasitic elements 106 of FIGS. 7 and 10 if desired. Antennas 40L and 40H may be arranged in any desired two-dimensional or one-dimensional pattern.

Figure 12:
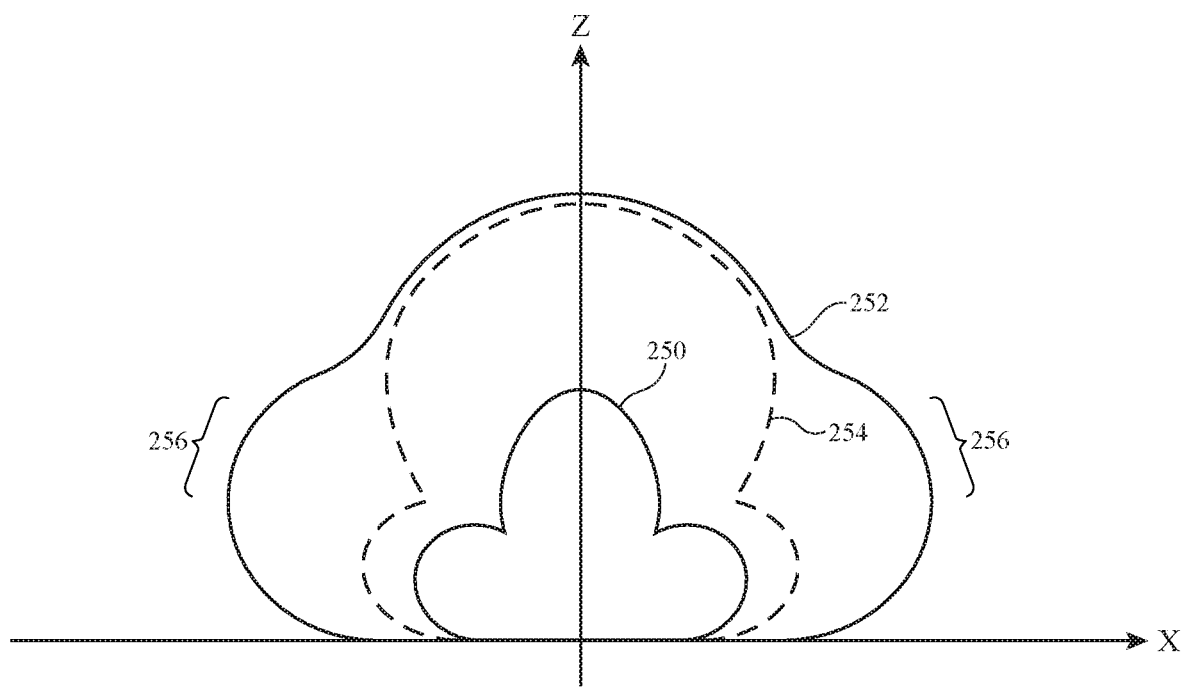
FIG. 12 is a diagram of an illustrative antenna radiation pattern associated with a phased antenna array of the type shown in FIGS. 7-13 in accordance with an embodiment.

FIG. 12 shows a cross-sectional side view of radiation patterns (e.g., radiation pattern envelopes) of phased antenna array 60 in the presence of dielectric cover layer 130 of FIG. 7. As shown in FIG. 12, curve 250 illustrates a radiation pattern envelope of phased antenna array 60 in scenarios where dielectric cover layer 130 does not form a quarter wave impedance transformer, phased antenna array 60 is not surrounded by fences of conductive vias 170, and dielectric spacer 128 is omitted. As shown by curve 250, the radiation pattern envelope for antenna array 60 may exhibit a reduced overall gain, local minima (troughs), and local maxima (peaks) at different angles. The reduced overall gain and local minima may be generated by signal attenuation and destructive interference within dielectric cover layer 130, and/or the absence of conductive vias 170, for example.

When dielectric cover layer 130 is configured to form a quarter wave impedance transformer and fences of conductive vias are formed around phased antenna array 60, signal reflections at interior surface 146 (FIG. 7) and signal attenuation and destructive interference within dielectric cover layer 130 may be minimized such that phased antenna array 60 exhibits a radiation pattern envelope as shown by curve 252. As shown by curve 252, the overall gain of phased antenna array 60 may be greater and the radiation pattern envelope of phased antenna array 60 may be more uniform at all angles within the field of view of phased antenna array 60 relative to scenarios associated with curve 250. At the same time, in scenarios associated with curve 252, phased antenna array 60 may generate excessive surface waves, leading to a relatively high low angle response, as shown by regions 256 of FIG. 12.

Curve 254 illustrates an exemplary radiation pattern envelope of phased antenna array 60 and aperture 129 of FIGS. 7-11. As shown by curve 254, phased antenna array 60 and aperture 129 may exhibit a higher overall gain than in scenarios associated with curve 250. At the same time, the presence of aperture 129 may focus the radiation pattern closer to the normal axis of the phased antenna array and may reduce the propagation of surface waves along interior surface 146 of dielectric cover layer 130 relative to scenarios associated with curve 252. In this way, phased antenna array 60 may operate with satisfactory antenna efficiency across all angles and with minimal surface wave propagation despite the presence of dielectric cover layer 130.

The example of FIG. 12 is merely illustrative. In general, radiation pattern envelopes 250, 252, and 254 may exhibit other shapes. The radiation pattern envelopes shown in FIG. 12 illustrate a two-dimensional cross-sectional side view of the radiation pattern envelopes. In general, radiation pattern envelopes for phased antenna array 60 and aperture 129 are three-dimensional.

The foregoing is merely illustrative and various modifications can be made to the described embodiments. The foregoing embodiments may be implemented individually or in any combination.

What is claimed is:

1. An electronic device comprising:
   a dielectric cover layer;
   a solid dielectric spacer mounted against a surface of the dielectric cover layer;
   a dielectric substrate mounted against the solid dielectric spacer, wherein the solid dielectric spacer is interposed between the dielectric substrate and the dielectric cover layer; and
   a phased antenna array on the dielectric substrate, wherein the phased antenna array is configured to transmit radio-frequency signals at a frequency between 10 GHz and 300 GHz through the solid dielectric spacer and the dielectric cover layer.

2. The electronic device defined in claim 1, further comprising:
   a conductive layer on the surface of the dielectric cover layer, wherein the conductive layer has an opening aligned with the phased antenna array.

3. The electronic device defined in claim 2, further comprising:
   vertical conductive structures that laterally surround the solid dielectric spacer and extend from edges of the opening in the conductive layer to the dielectric substrate.

4. The electronic device defined in claim 3, wherein the phased antenna array comprises:
   ground traces embedded in the dielectric substrate; and
   a plurality of antenna resonating elements interposed between the ground traces and the solid dielectric spacer.

5. The electronic device defined in claim 4, further comprising:
   fences of conductive vias in the dielectric substrate, wherein the fences of conductive vias laterally surround the plurality of antenna resonating elements and extend from the ground traces to the vertical conductive structures through the dielectric substrate.

6. The electronic device defined in claim 5, wherein the phased antenna array further comprises:
   a plurality of parasitic antenna resonating elements interposed between the plurality of antenna resonating elements and the solid dielectric spacer, wherein the fences of conductive vias laterally surround the plurality of parasitic antenna resonating elements.

7. The electronic device defined in claim 5, wherein each antenna resonating element in the plurality of antenna resonating elements comprises first and second positive antenna feed terminals coupled to respective first and second transmission line paths.

8. The electronic device defined in claim 3, further comprising:
   a housing, wherein the conductive layer is formed from a portion of the housing.

9. The electronic device defined in claim 3, wherein the solid dielectric spacer and the vertical conductive structures are configured to exhibit a resonant cavity mode at the frequency.

10. The electronic device defined in claim 1, wherein the dielectric cover layer has a first thickness and the solid dielectric spacer has a second thickness that is greater than the first thickness.

11. The electronic device defined in claim 10, wherein the dielectric cover layer has a first dielectric constant and the solid dielectric spacer has a second dielectric constant that is less than the first dielectric constant.

12. The electronic device defined in claim 11, wherein the electronic device has opposing first and second faces and further comprises:
a display having a display cover layer and pixel circuitry that emits light through the display cover layer, wherein the display cover layer forms the first face of the electronic device, the dielectric cover layer forms the second face of the electronic device, and the dielectric cover layer comprises glass.

13. The electronic device defined in claim 1, wherein the solid dielectric spacer has opposing first and second surfaces, the first surface is attached to the dielectric substrate, and the second surface is attached to the dielectric cover layer.

14. The electronic device defined in claim 1, further comprising:
peripheral conductive housing structures; and
a display mounted to the peripheral conductive housing structures opposite the dielectric cover layer.

15. The electronic device defined in claim 1, wherein the solid dielectric spacer exhibits a resonant cavity mode at the frequency.

16. The electronic device defined in claim 1, further comprising a radio-frequency integrated circuit mounted to the dielectric substrate.

17. The electronic device defined in claim 1, wherein the dielectric cover layer is configured to form a quarter wave impedance transformer at the frequency for the phased antenna array.

18. The electronic device defined in claim 1, wherein the phased antenna array comprises:
ground traces embedded in the dielectric substrate; and
a plurality of antenna resonating elements interposed between the ground traces and the solid dielectric spacer.

19. The electronic device defined in claim 18, further comprising fences of conductive vias in the dielectric substrate, wherein the fences of conductive vias laterally surround the plurality of antenna resonating elements and extend from the ground traces to the solid dielectric spacer through the dielectric substrate.

20. An electronic device comprising:
a dielectric cover layer;
a dielectric spacer mounted against a surface of the dielectric cover layer;
a dielectric substrate mounted against the dielectric spacer, wherein the dielectric spacer is interposed between the dielectric substrate and the dielectric cover layer, the dielectric spacer is an additional dielectric substrate, and a surface of the additional dielectric substrate is attached to the surface of the dielectric cover layer; and
a phased antenna array on the dielectric substrate, wherein the phased antenna array is configured to transmit radio-frequency signals at a frequency between 10 GHz and 300 GHz through the dielectric spacer and the dielectric cover layer.

* * * * *